United States Patent
Smith et al.

(10) Patent No.: US 11,272,057 B1
(45) Date of Patent: *Mar. 8, 2022

(54) LEARNING BASED METRIC DETERMINATION FOR SERVICE SESSIONS

(71) Applicant: United Services Automobile Association (USAA), San Antonio, TX (US)

(72) Inventors: Eric J. Smith, Helotes, TX (US); John McChesney TenEyck, Jr., San Antonio, TX (US); Gregory Yarbrough, San Antonio, TX (US); Vijay Jayapalan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/096,544

(22) Filed: Nov. 12, 2020

Related U.S. Application Data

(63) Continuation of application No. 16/107,228, filed on Aug. 21, 2018, now Pat. No. 10,855,844.

(60) Provisional application No. 62/548,669, filed on Aug. 22, 2017.

(51) Int. Cl.
*H04M 3/51* (2006.01)
*H04M 3/523* (2006.01)

(52) U.S. Cl.
CPC ......... *H04M 3/5175* (2013.01); *H04M 3/523* (2013.01); *H04M 2203/401* (2013.01)

(58) Field of Classification Search
CPC ......... H04M 3/5175; H04M 2203/401; H04M 3/42221
See application file for complete search history.

(56) References Cited

U.S. PATENT DOCUMENTS

| | | | |
|---|---|---|---|
| 7,940,914 | B2 | 5/2011 | Petrushin |
| 9,336,772 | B1 | 5/2016 | Salvador et al. |
| 10,438,212 | B1 | 10/2019 | Jilani et al. |
| 2002/0131399 | A1 | 9/2002 | Philonenko |
| 2012/0297395 | A1 | 11/2012 | Marchand et al. |
| 2016/0164762 | A1 | 6/2016 | Reque et al. |
| 2016/0180381 | A1 | 6/2016 | Kaiser et al. |

(Continued)

OTHER PUBLICATIONS

U.S. Appl. No. 15/981,477, Smith et al., filed May 16, 2018.

(Continued)

*Primary Examiner* — Rasha S Al Aubaidi
(74) *Attorney, Agent, or Firm* — Fish & Richardson P.C.

(57) ABSTRACT

Techniques are described for generating metrics about an individual's experience. One of the method describes providing, by at least one processor, the session record as input to at least one computer-processable model that determines, based on the session record, at least one metric for the service session, the at least one model having been trained, using machine learning and based at least partly on survey data for previous service sessions, to provide the at least one metric associated with the individual's experience. The method includes associating, by at least one processor, the metric of the individual's experience with the individual. The method also includes communicating, by at least one processor, the at least one metric for presentation through a user interface of a computing device.

15 Claims, 11 Drawing Sheets

(56) References Cited

U.S. PATENT DOCUMENTS

2018/0330278 A1 11/2018 Ghajar et al.

OTHER PUBLICATIONS

U.S. Appl. No. 16/593,333, Smith et al., filed Oct. 4, 2019.
USPTO Transaction History for U.S. Appl. No. 15/981,477, filed May 16, 2019, 136 pages.
USPTO Transaction History for U.S. Appl. No. 16/593,333, filed Oct. 4, 2019, 54 pages.

LEARNING BASED METRIC DETERMINATION FOR SERVICE SESSIONS

CROSS-REFERENCE TO RELATED APPLICATION

This application is a continuation application of and claims priority under 35 U.S.C. § 120 to U.S. application Ser. No. 16/107,228, filed on Aug. 21, 2018, which claims priority under 35 USC § 119(e) to U.S. Patent Application Ser. No. 62/548,669, filed on Aug. 22, 2017, the entire contents of each of which are hereby incorporated by reference.

BACKGROUND

An organization may use any number of computing systems, communications networks, data storage devices, or other types of systems to provide service to individuals. An organization may also employ service representatives that use the various systems to assist individuals in service sessions that are conducted over the telephone, in a video conference, through text chat sessions, in person, and/or over other communication channels. Organizations may strive to provide an efficient and productive service interaction between service representatives and the individuals being serviced, while maintaining an appropriate quality level for the service provided by service representatives.

SUMMARY

Implementations of the present disclosure are generally directed to determining one or more metrics that describe a service session. More specifically, implementations are directed to using machine learning techniques, such as deep learning that includes classification, clustering, and/or other techniques, to determine metric(s) for a service session and a customer experience.

In general, innovative aspects of the subject matter described in this specification can be embodied in methods that includes actions of receiving, by at least one processor, a session record of communications between a service representative (SR) and an individual during a service session. The methods include the actions of providing, by at least one processor, the session record as input to at least one computer-processable model that determines, based on the session record, at least one metric for the service session, the at least one model having been trained, using machine learning and based at least partly on survey data for previous service sessions, to provide the at least one metric associated with the individual's experience. The methods include the actions of associating, by at least one processor, the metric of the individual's experience with the individual. The methods also include the actions of communicating, by at least one processor, the at least one metric for presentation through a user interface of a computing device.

Implementations can optionally include one or more of the following features, alone or in combination. The service session may be an audio call between the CSR and the individual. The session record may include an audio record of at least a portion of the audio call. The methods may include developing, by at least one processor, the at least one model based on training data that describes, for each of a plurality of previous service sessions: a previous session record of communications during a respective previous service session, and at least one survey score provided to rate the respective previous service session. The respective previous service session may be an audio call; and the previous session record may include an audio record of at least a portion of the audio call. The methods may include the actions of updating the customer's requirements based on metric and selecting another service representative to interact with the individual on a subsequent service session based in part on the updated customer requirements. The methods may include the actions of receiving a request for a service session from a first individual, identifying a second individual similar to the first individual, and connecting the first individual with another service representative, where the other service representative is selected, at least in part, based on the metrics associated with the second individual.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Through use of machine learning developed models to determine metrics that are predicted survey results, implementations provide a technique to determine survey results in a service environment even in instances when the individual being serviced does not complete a survey. Moreover, the model(s) enable an objective determination of survey results across a wider range of individuals than would ordinarily complete survey results, thus providing more accurate, objective, and comprehensive view of the service provided in a service environment. By providing more accurate survey results through use of predictive modeling, implementations may avoid repeatedly requesting that individual(s) complete surveys following a service session, thus avoiding the expenditure of processing power, network bandwidth, storage space, active memory, and/or other computing resources that may be expended in traditional service environments. In instances where the predictive model(s) are sufficiently developed to enable session metric(s) to be determined without surveying individuals, implementations also avoid the expenditure of computing resources that would otherwise be consumed to survey individuals following a service session.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for determining metric(s) that rate characteristic(s) of a service session between a service representative (SR) and an individual (e.g., a customer) in a service environment. In a service environment, such as a call center environment, one or more CSRs may assist individual(s) w420ho need assistance with various questions and/or problems. For example, a call center for a product providing organization may operate a call center to answer questions from customers who use the product(s) provided by the organization. A service session between a CSR and an individual may also be described as a call, such as in instances when the session is conducted over a telephone call, voice chat session, or other communication session that includes audio communications.

A dynamic automated call distributor (ACD) can support a dynamic number of decentralized customer service representatives. The dynamic ACD can manage a number of potential customer services representatives available to handle calls remotely, for example, while working from home or from another remote location. This dynamic ad-hoc arrangement enables flexibility for the customer service representative while enabling the ACD to meet service level agreements with respect to call wait time (and other factors) while minimizing the out of pocket costs. The customer service representative can determine when they want to work and the minimum amount of money that they are willing to work for. For example, the customer service representatives can be paid on a per-call basis. This enables the call center to manage their call capacity dynamically.

Figure 1:
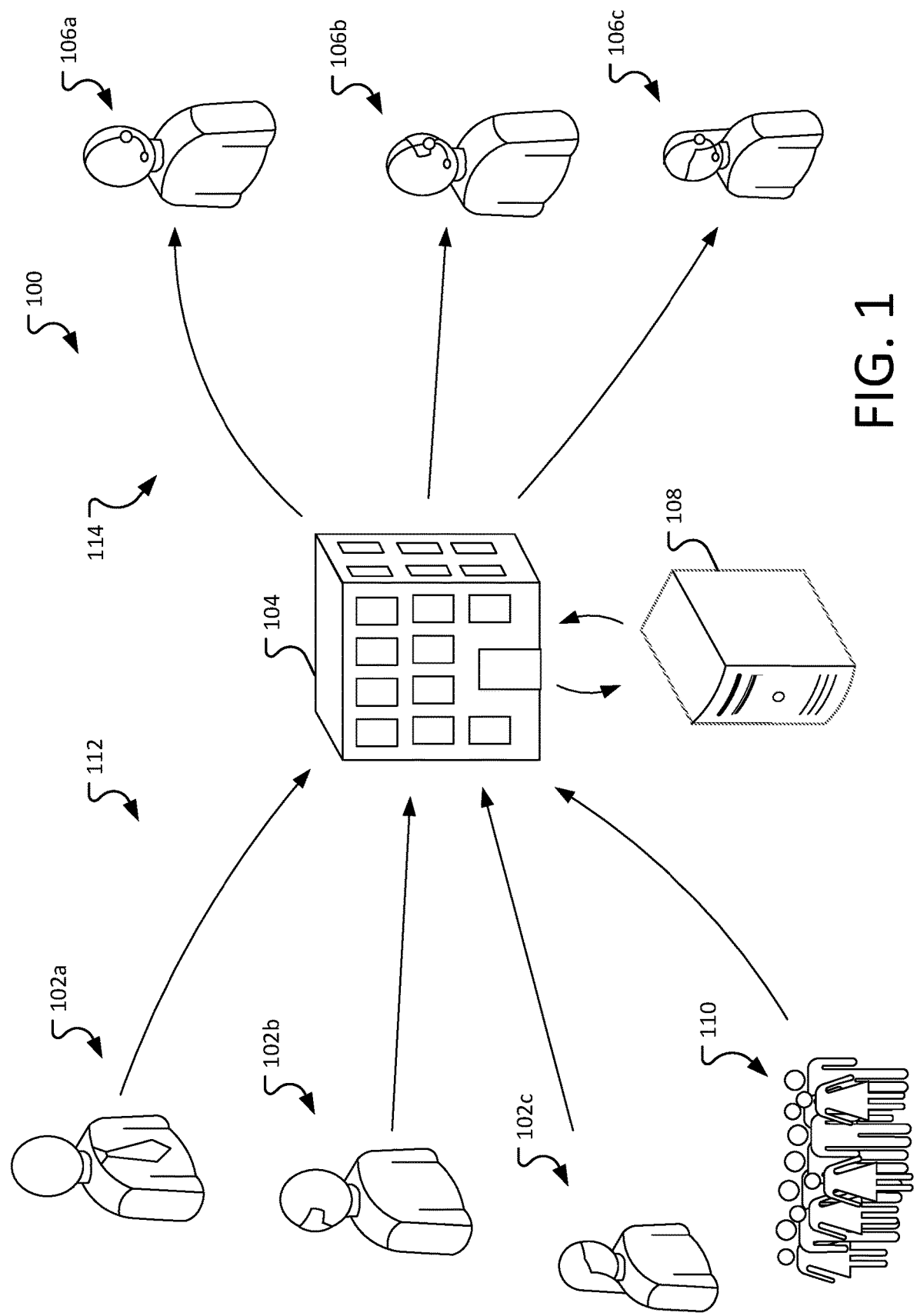
FIG. 1 illustrates an example of a call center environment with dynamic resource management.

FIG. 1 illustrates an example of a call center environment 100 with dynamic resource management. During normal call loads, callers 112 (as represented by individual callers 102*a-c*) call the call center 104 (or company) and are routed to customer service representatives (CSRs) 114 (represented by CSRs 106*a-c*). Callers 112 represent the demand for customer service capabilities and the CSRs represent the supply of customer service capabilities. When the demand for customer service exceeds the supply of CSRs, callers can be routed into a queuing system 108. The queuing system can play music for the caller while they wait, and/or can present self-service options.

While under normal circumstances, call volume can be generally predicted. However, circumstances can occur where demand for customer service can suddenly increase, resulting in a large number of additional callers (represented by the crowd 110) to call the call center 104. For example, news that a retail chain had credit card numbers hacked or a natural disaster can cause the volume of calls to rise precipitously.

In a conventional call center, these callers would spend an excessive amount of time in a queue or can receive a busy signal when the queuing system is overloaded. However, the call center environment 100 includes the capability to dynamically assign additional CSRs 114 to handle the additional call volume, as explained further below. Further, the call center can allocate additional computer systems to handle queueing and managing the increased call volume.

At the same time, calls to a call center may be lower than expected. For example, due to a school vacation week, the start of a sporting season, etc. Under these circumstance, the call center can reduce the number of CSRs 114.

Figure 2:
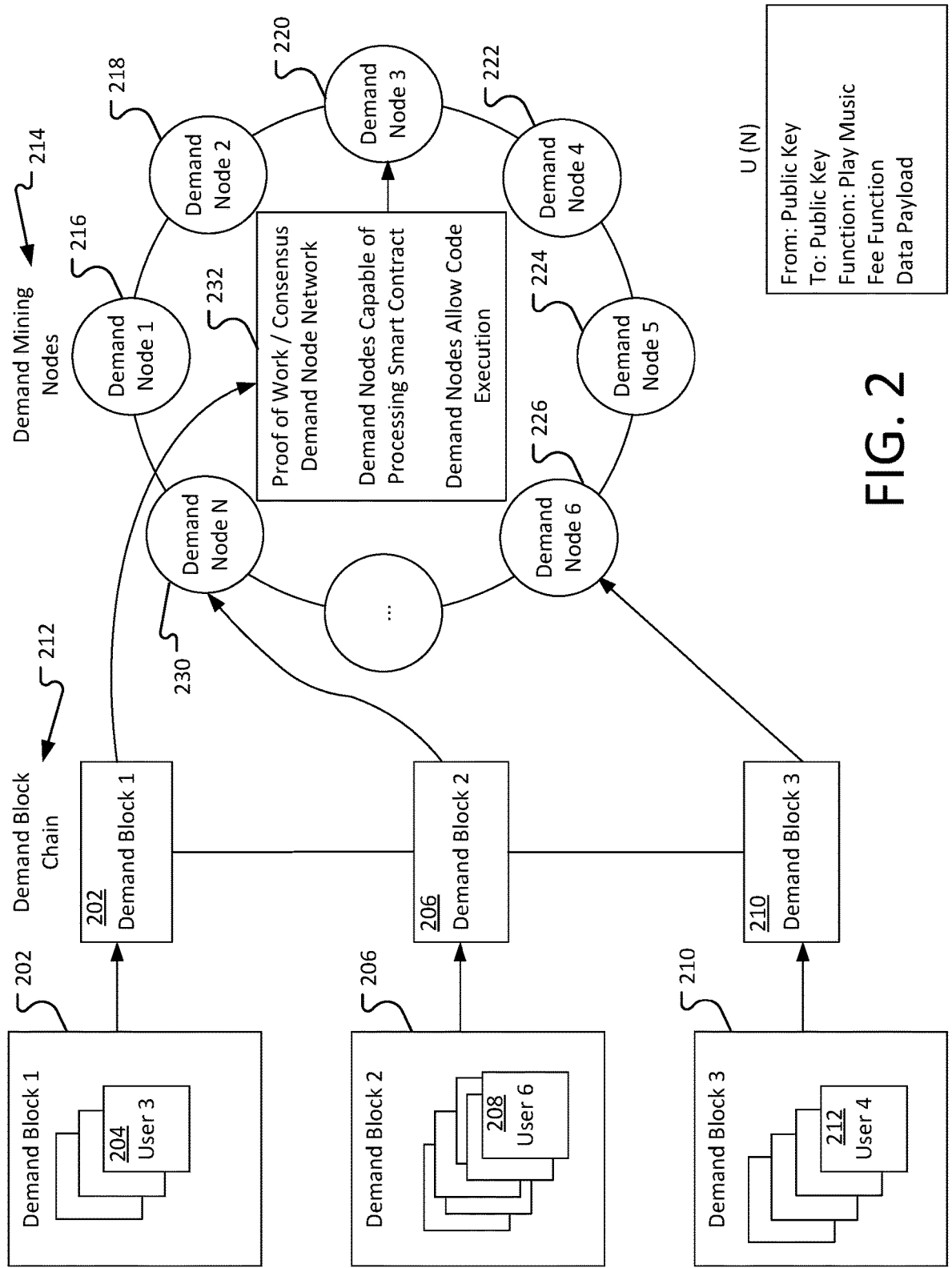
FIG. 2 illustrates an example system for allocating callers to different processing machine, referred to as nodes).

FIG. 2 illustrates an example system for allocating callers to different processing machine, referred to as nodes). When a caller calls into the call center, the caller can be grouped with other callers into demand blocks in a block chain.

To provide some basic context into blockchain technologies, in general, a blockchain is a public or private ledger of all transactions that have been executed in one or more contexts (e.g., negotiable instrument transactions, digital currency transactions, access determinations, instances of providing access, calls to a call center, customer service reps signing into a call center etc.). A blockchain can grow as completed blocks are added with a new set of transactions. In some examples, a single block is provided from multiple transactions (e.g., multiple callers into a call center). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network can need to know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains can also employ other protocols. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes can compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner can be required to produce hundreds or thousands of hash values, before any one miner provides a qualifying hash value (e.g., at least the first four characters of the hash value are each zero).

In this example, demand nodes 214 (including demand nodes 1 216, demand node 2, 218, demand node 3 220, demand node 4 222, demand node 5 224, demand node 6 226, demand node N 230) can compete to manage a particular demand block. Custom block chain solutions can use different proof of work functions 232. For example, proof of work in the dynamic call center can include demonstrating the ability and readiness to manage the number of calls included in the demand block (that is, three users for demand block 1 202, six users for demand block 2 216, three users for demand block 3 210).

The ability to manage the number of calls can include verifying that the demand mining node includes the capability to queue the number of callers. The ability to manage the number of calls can also include demonstrating or verifying the ability to perform the required functions (such as the ability to play the recorded music, the ability to interface with a self-help function, and/or the ability to perform the necessary functions to match a caller with an available CSR). In some implementations, a cost can be associated with a particular demand mining node. The cost can be an out of pocket cost (for example, an amount charged to rent or use a particular node), the cost can also be an opportunity costs assigned by the call center. This cost can be used to prioritize the use of some mining nodes based on the mining node passing of performing the proof of work; demand blocks can be assigned to particular demand mining nodes. For example, demand block 1 202 can be assigned to demand node 3 220, demand block 2 206 can be assigned to demand block N 230, demand block 3 210 can be assigned to demand node 6 226.

Figure 3:
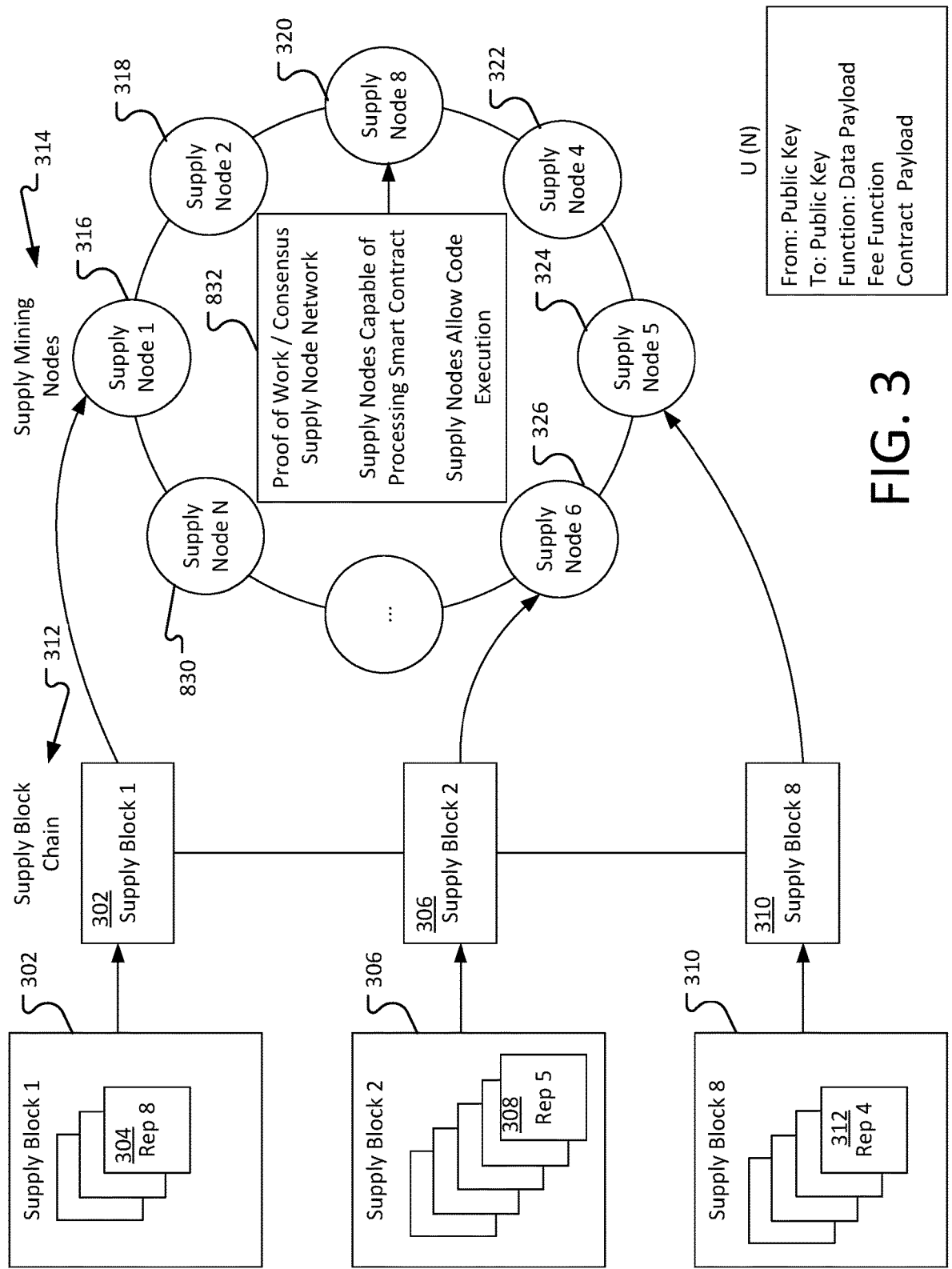
FIG. 3 illustrates registering CSRs to be ready to answer calls.

FIG. 3 illustrates a registering CSRs to be ready to answer calls. CSRs who log into the system can be grouped into supply blocks. For example, supply block 1 302 includes 3 CRs 304, supply block 2 306 includes 5 CSRs 308, and supply block 3 includes 4 CSRs 310.

In this example, supply nodes 314 (including supply nodes 1 316, supply node 2 318, supply node 3 320, supply node 4 322, supply node 5 324, supply node 6 326, supply node N 330) can compete to manage a particular supply block.

CSR's can be grouped into supply blocks based on, for example, the time that they registered their availability with the system, their qualifications, their price, reputations, etc. The supply nodes compete to provide services to the supply blocks by executing a proof of work. The proof of work can be, for example, proof that the supply nodes have sufficient resources to manage the CSRs in the supply block. The proof of work can also include logging the CSRs into the system and identifying the capability or qualifications of the CSRs. The proof of work can also include verifying that the CSR has the necessary computing resources set up and ready to display caller information and address caller concerns. The proof of work calculation can also include matching a price of the members of the supply block with a current price being paid by the call center for calls.

In this example, supply block 1 302 is assigned to supply node 1 316, supply block 2 306 is assigned to supply node 6 326, supply block 3 310 is assigned to supply node 5 324.

Once a particular supply block and a demand block have been assigned to supply nodes and demand nodes respectively, the system can match the individual callers with individual customer service representatives as described below.

Figure 4:
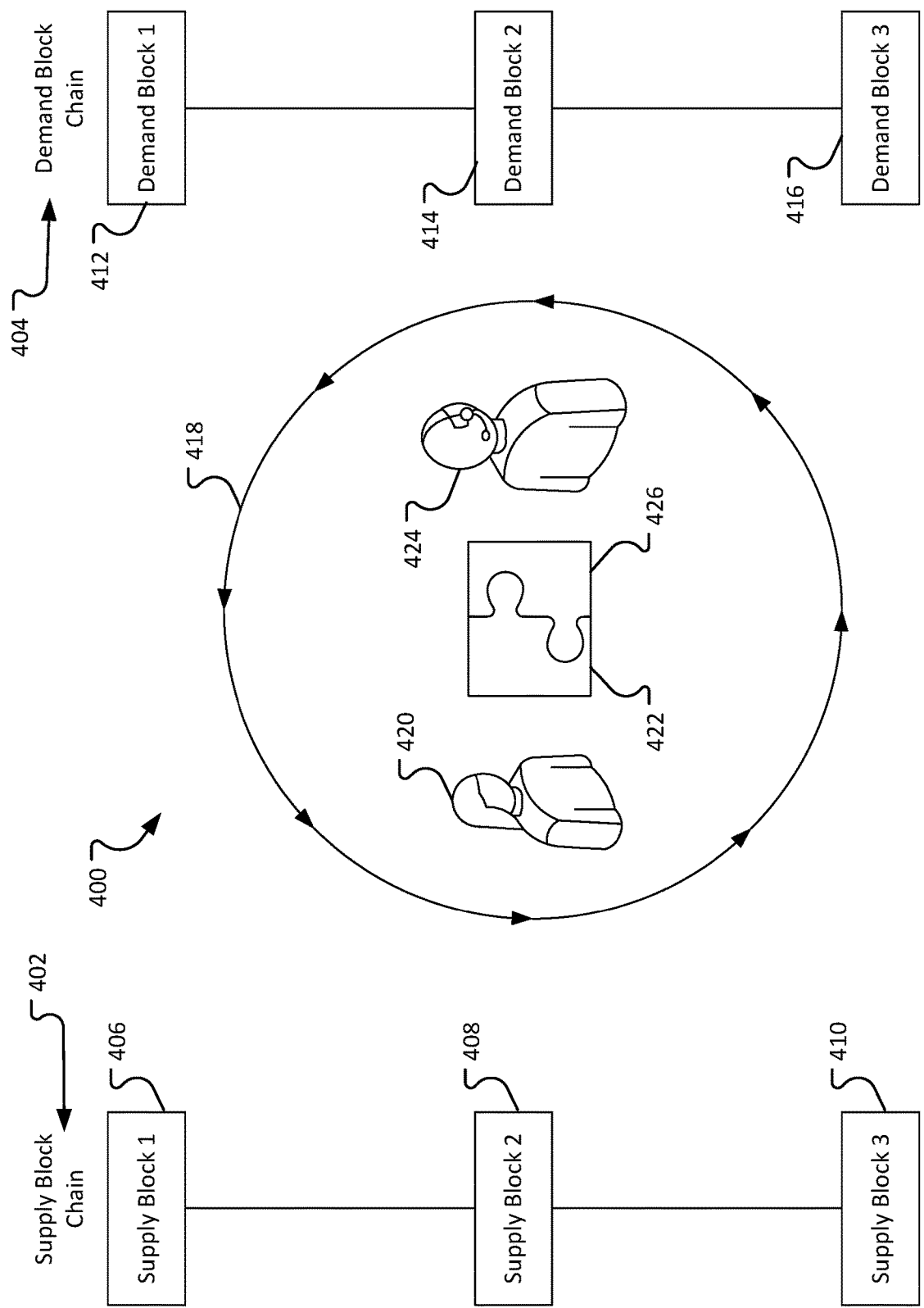
FIG. 4 illustrates an example system for matching supply blocks with demand blocks.

FIG. 4 illustrates an example system for matching supply blocks with demand blocks. The blocks in the supply block chain 402 can be matched with blocks in the demand chain 404 using a swarm algorithm 418.

Swarm algorithms describe collective behavior of decentralized, self-organized systems, natural or artificial. An agent can represent each caller and CSR. The agents interacting locally with one another and with their environment in order to associate a particular caller with a particular CSR. Each of the agents follows simple rules that allow callers and CSRs to be connected without a centralized control structure dictating how individual agents should behave. Some implementations can use a distributed hash table algorithm, such as KADEMLIA (a distributed hash table for decentralized peer-to-peer computer networks).

In some implementations, matching a caller 420 with a CSR 424 can occur using a smart contract. Each caller may have certain requirements (represented by the puzzle piece 422), these requirements may be determined by the automated call distributor (for example, the current price being paid per call, the required reputation of the CSR). The requirements also may be determined by the caller (for example, the subject and/or business unit associated with the caller's needs).

The CSRs may each be associated with their own requirements (represented by the puzzle piece 426). For example, a CSR may be able to dictate an amount (or minimum amount) that they wish to be paid for taking the call. The CSR may also dictate the hours that the CSR is willing to take calls, a maximum number of calls that they are willing to take, or a commitment of a minimum number of calls per hour.

The CSR may also have qualifications. These qualifications can include, for example, certifications to handle calls in particular business areas, security clearance, and a reputation score.

The swarm algorithms may match a caller 420 with a compatible CSR 424 (that is a CSR's whose requirements and qualifications are compatible with the caller's requirements). For example, in some implementations, the swarm algorithm may match callers to CSRs based on based on price, reputations, and business area.

The reputation of a CSR may be determined based on various metrics including, for example, average call time, call quality (as measured by customer surveys or through automated analysis described further below), and business outcomes. The reputation of the CSR may be represented by a score that provides a numeric indicator of the CSR's reputation.

In some implementations, a CSR may be able to increase their reputation score by completing certification and training course.

Traditionally, following the service session, the individual who was participating in the session may complete a survey to answer questions regarding the service session. For example, a survey may ask whether the individual was satisfied with the service provided by the CSR during the service session, whether the individual is satisfied with the product that was the subject of the service session, whether the individual was satisfied with the service environment used to provide the service session, and so forth. In instances where the service session was conducted as an audio call (e.g., telephonically), the survey questions may be presented to the individual as audio output (e.g., generated speech), and the individual may respond by speaking an answer. Although individuals serviced in the service environment may be given the opportunity to complete a survey, not all the individuals may opt to do so, given the time and effort involved. Moreover, an individual may be more likely to complete a survey if the individual is angry or dissatisfied with the service provided. Accordingly, the completed surveys in a traditional service environment may be provide an incomplete view of the overall quality of the service, and may be skewed toward more negative surveys. Given such shortcomings in a traditional environment, it may be difficult for an organization to develop objective and accurate knowledge regarding the quality of the service being provided.

Implementations provide a technique for generating metric(s) that predict survey score(s) for a service session, such as in instances where the individual being serviced does not complete a survey following the service session. One or more models may be developed using machine learning (ML), as described further below. In some implementations, model(s) may be trained, through supervised ML, using training data from previous service sessions between CSR(s) and individual(s) in the service environment. Training data may include, for each of one or more previous service sessions, a session record of the session and a set of survey scores provided by the serviced individual to rate the session on one or more criteria (e.g., survey questions). The model(s) may be trained to output, based on an input session record, metric(s) that each correspond to a survey score that would have been provided by the individual had they completed the survey. Accordingly, some implementations provide predicted survey results in instances where the serviced individual does not complete a survey, and thus provide for a more complete set of survey results associated with a larger subset (or all) of the individuals serviced within a call center or other service environment. Moreover, once the model(s) are sufficiently trained and/or refined to provide accurate estimates of survey results, fewer (or no) serviced individuals may be asked to complete a survey, thus providing a more positive user experience for individuals serviced through the call center or other service environment.

Figure 5:
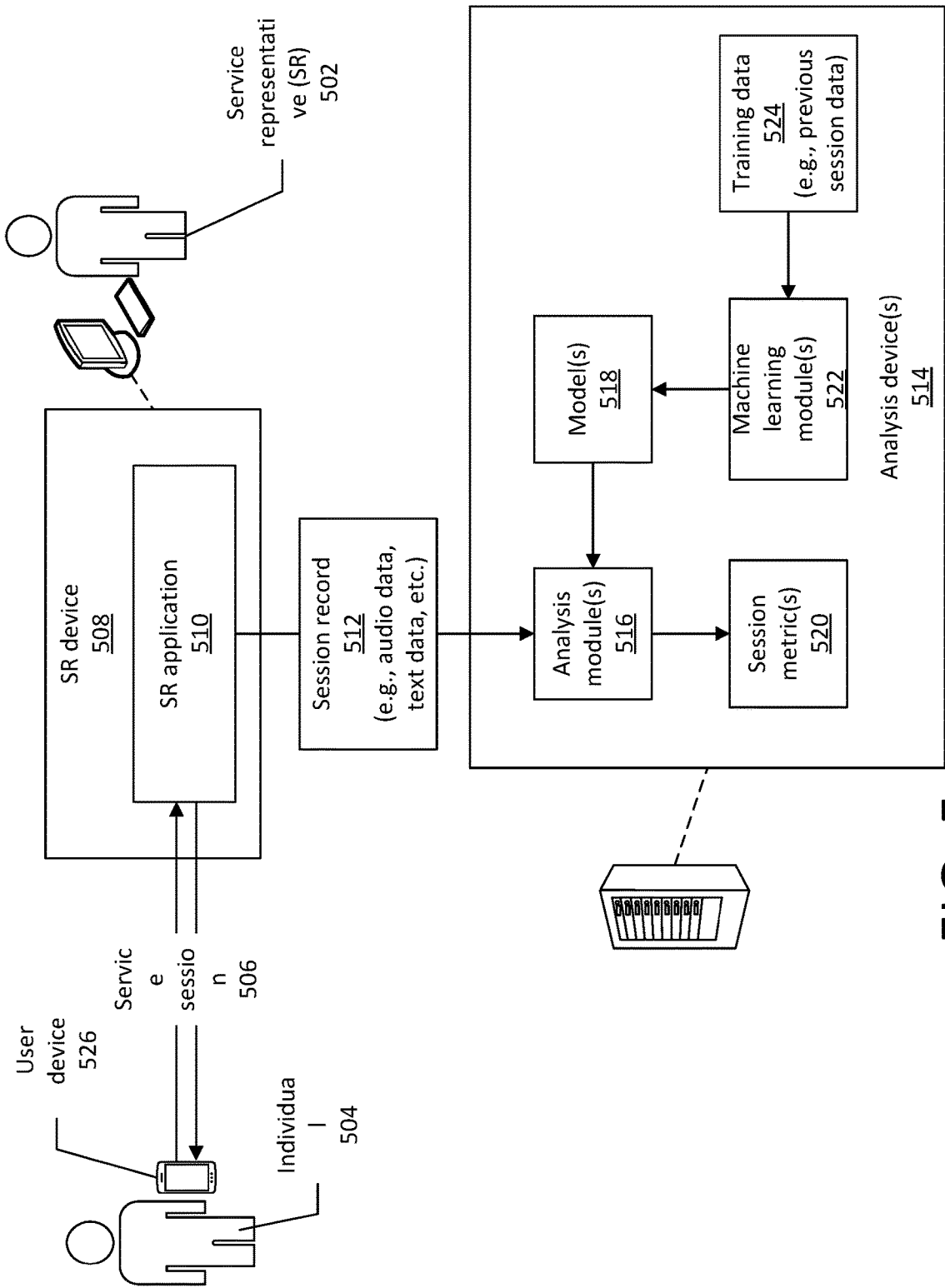
FIG. 5 depicts an example system for determining metric(s) for service session(s), according to implementations of the present disclosure.

FIG. 5 depicts an example system for determining metric(s) for service session(s), according to implementations of the present disclosure. As shown in FIG. 5, a CSR 502 may communicate with an individual 504 (e.g., a customer) during a service session 506. A CSR 502 and an individual 504 may participate in a service session 506 in which the CSR 502 attempts to assist the individual 504 with respect to products and/or services provided by an organization that employs or otherwise includes the CSR 502. A service session 506 may include any number of communications between an individual 504 and a CSR 502. In some examples, a service request (e.g., question, complaint, inquiry, etc.) may be received from an individual 504 via a telephone call, a real-time chat session, text message, email, or other communications channel. A CSR 502 may respond to the service request via a voice response, text response, or otherwise. The individual 504 may submit any number of follow-up questions, and the CSR 502 may respond in turn. Accordingly, a service session 506 may constitute a conversation between the individual 504 and the CSR 502 that includes any number of communications sent between the parties over any period of time. The service session 506 may begin when the individual 504 initially submits a service request and/or when the CSR 502 initially responds to the service request. In some examples, the CSR 502 may initiate the service session 506 by sending an initial communication to the individual 504.

The individual 504 (e.g., customer) may employ a user device 526 to send and receive communications during the service session 506. The user device 526 may include any suitable type of computing device, such as a personal computer, laptop computer, tablet computer, smartphone, wearable computer, and/or other types of computing devices. The user device 526 may execute a user application that enables the individual 504 to send and receive communications during the service session 506, or otherwise participate in the service session 506.

The CSR 502 may employ a CSR device 508, which may include any suitable type of computing device. The CSR device 508 may execute a CSR application 510 that facilitates the CSR's communications with the individual 504 during service session(s) 506. For example, the CSR application 510 may provide voice telephony services and/or audio/video chat functionality that enables the CSR 502 to engage in a voice and/or video conversation with the individual 504. As another example, the CSR application 510 may provide real time (e.g., chat) functionality, that enables the CSR 502 to exchange text messages with the individual 504. In some instances, a service session 506 may include multiple types of communication, including audio (e.g., voice) communication, communicated text data, and/or shared viewing of documents, such as text documents, images, graphics, video, and so forth.

In some implementations, a session record 512 may be generated for each of one or more service sessions 506. The session record 512 may describe various communications (e.g., voice, text, or otherwise) sent by the CSR 502 and/or the individual 504 during the service session(s) 506. In some implementations, where the service session 506 is conducted as a voice telephony conversation, video chat session, and/or audio chat session using a telephone network, voice over internet protocol (VOIP), streaming video and/or audio, or other communication protocols, the session record 512 includes audio data that is a recording of at least a portion of the service session 506. In some instances, the session record 512 includes a text transcript that is generated using a speech-to-text (STT) algorithm, based on the audio data of the service session 506. In implementations where the service session 506 is conducted as a text chat session over a social network, instant messaging (IM) connection, SMS or MMS messages, and so forth, the session record 512 may include at least a portion of the text data exchanged between the individual 504 and CSR 502 participating in the service session 506.

The session record 512 may be communicated, over one or more networks, to one or more analysis devices 514 that execute one or more analysis modules 516. The analysis device(s) 514 may include any suitable number and type of computing device, such as server computer(s), distributed computing device(s) (e.g., cloud server(s)), and so forth. In some instances, the session record(s) 512 may be collected by the CSR application(s) 510 executing during one or more service sessions 506, stored on the CSR device(s) 508, and sent to the analysis device(s) 514 in a batch. Alternatively, the session record 512 of a service session 506 may be sent (e.g., in real time) to the analysis device(s) 514 following the completion of the service session 506. In some instances, the service record 512 may be generated by some other process, other than the CSR application 510, that monitors the communications during the service session(s) 506 and generates the session record(s) 512 based on the communications.

The session record 512 may include text data if the service session 506 is being conducted as a text chat session or some other exchange of messages that include text. The session record 512 may include audio data if the service session 506 is being conducted as a voice chat, audio chat, or video conference session using a telephone network, a VOIP service, a video chat service, and so forth. In scenarios where the service session 506 is a video chat session, the session record 512 may include individual frame image(s) or video stream data of the CSR's and/or individual's face. Audio data included in the session record 512 (e.g., collected during a voice and/or video chat session) may be transcribed using STT software to generate text data based on the audio data.

The analysis module(s) 516 may analyze the session record 512 to determine one or more session metrics 520 that each measures a characteristic of the session 506. The session metric(s) 520 may be stored in persistent memory (e.g., data storage) on the analysis device(s) 514 or elsewhere. In some implementations, the session metric(s) 520 may be communicated, over one or more networks, to a computing device, to cause the computing device to display the metric(s) 520 through a user interface (UI), such as the UI of the CSR application 510 or some other application. In some implementations, the session record 512 may be generated and analyzed in real time during a service session 506 between a CSR 502 and an individual 504 to determine session metric(s) 520. In some implementations, the session record 512 may be generated (e.g., recorded or otherwise captured) and stored during a service session 506. The session record 512 may be later transmitted to the analysis device(s) 514 analyzed to determine the session metric(s) 520.

Implementations support various formats for session metric(s) 520. In some implementations, the session metric(s) 520 may be numeric values that range on a scale from a minimum to a maximum value. For example, the session metric(s) 520 may each range from 0 to 10, where 0 indicates minimum (e.g., worst) rating for a particular characteristic of the session 506, and 10 indicates maximum (e.g., best) rating.

In some implementations, one or more of the generation of the session record 512, the analysis of the session record 512, the determination of metric(s) 520, and/or the communication and display of the metric(s) 520 may be performed in real time with respect to the completion of the service session 506, or in real time during the service session 506. A real time operation may refer to an operation that is performed in response to detecting some triggering event or state, such that the operation is performed without undue delay following the triggering event or state, taking into account the time spent to communicate and/or process the data. The operation may be performed, or at least initiated, within a short period of time following the triggering event or state. In some instances, the operation may be performed as part of a same execution path as a process that detects the triggering event or state.

The model(s) 518 may be developed (e.g., trained) and/or updated (e.g., retrained and/or refined) through operations of one or more ML modules 522 executing on the analysis device(s) 514 or elsewhere. The ML module(s) 522 may develop and/or update the model(s) 518 using training data 524, including historical data collected regarding previously completed service sessions 506.

Figure 6:
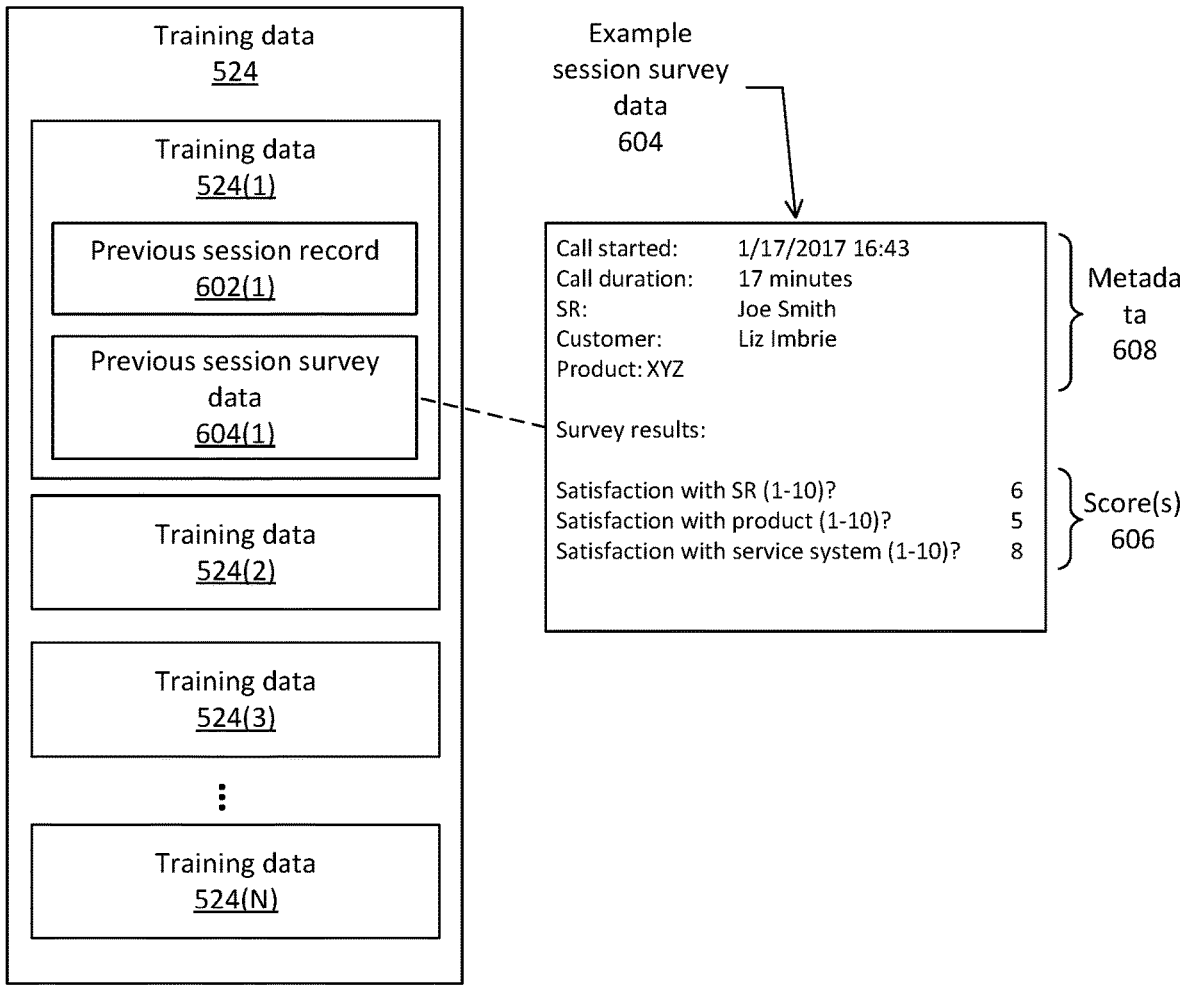
FIG. 6 depicts an example of training data used to provide model(s) for determining metric(s), according to implementations of the present disclosure.

FIG. 6 depicts an example of training data 524 used to generate the model(s) 518 for determining metric(s) 520, according to implementations of the present disclosure. As shown in the example of FIG. 2, the training data 524 may include any suitable number of sets of training data 524(1), 524(2), 524(3), . . . , 524(N). Each set of training data 524 may be associated with a previously conducted and recorded service session, and may include a session record 602 for the previous session, such as audio data, text data, and so forth. The set of training data 524 may also include survey data 604 associated with the previous session. The survey data 604 may include the results of a survey taken by the individual (e.g., customer) who participated in the session.

Implementations are not limited to the particular example of training data 524 shown in FIG. 2, and may include less information, more information, differently formatted information, and so forth. As shown in the example, the survey data 604 for a particular session may include one or more scores 606 that each provides a rating of a particular characteristic of the session, such as whether the individual was satisfied with the CSR conducting the session, the product that was the topic of the session, or the service system itself (e.g., the call center or other service environment). In some implementations, as shown in FIG. 2, each score may be a numeric score provided by the individual 504 to rate the corresponding question along a range of possible values (e.g., from 1 to 10).

A survey may include any suitable number of questions, such as 10-12 questions. In one example, a survey asks the individual 504 to provide a score for each of the follow categories: overall satisfaction with the company providing the service; overall satisfaction with the CSR; completeness or adequacy of CSR knowledge; CSR offering appropriate products; CSR effectiveness; whether the CSR was able to complete the individual's request; whether the individual has called about this request recently (e.g., in the past 30 days); whether the service-providing organization should have completed this request on a prior call; why the service-providing organization was not able to complete the request on a prior call; why the CSR was unable to complete the request today; what the serviced individual liked about this call; what the CSR and/or service-providing organization could have done to improve the individual's experience. Some of the categories may ask the individual 504 to provide a numeric score (e.g., from 1 to 10). Some of the categories may ask the individual 504 to provide a score that is "yes", "no", or "I do not know." Some of the categories may ask the individual 504 to describe their answer verbally (e.g., through 30-60 seconds of recorded audio). The survey may also ask the individual 504 to give feedback as free-form audio, enabling the individual 504 to elaborate on various issues and/or bring up issues that are not otherwise addressed in the survey.

Survey data from past surveys over a period of time (e.g., months, years, etc.) may be stored along with session records of the various sessions that were the subject of the surveys. In some implementations, ML techniques may be applied to the stored historical survey data, and to the stored historical session records, to develop the model(s) 518. In some implementations, the ML techniques may include deep learning, in which different models may be developed to predict different features in the session records. For example, a neural network and/or classification technique may be used to train a model that is a classifier and that is useable to infer and/or predict answers to survey questions following a service session, such as in instances where the individual 504 did not complete a survey following the session. In some examples, the historical survey data and history session records may be described as labeled training data, where the survey scores provide labels for the corresponding session record.

In some implementations, the applied ML techniques include feature extraction to build different neurons within a neural network, where each neuron corresponds to a feature of the session records. One or more features may translate to one or more survey questions. For example, a particular feature may correspond to a particular survey question, such that the strength of a feature present in a session record leads to a particular metric being determined for the corresponding survey question. Features may correspond to negative and/or positive sentiments expressed by an individual during a session. A feature may correspond to one or more neurons that each indicates a characteristic of the session. In some instances, a feature may correspond to a particular relationship, or interrelationship, between multiple neurons. In some implementations, each feature is associated with a different neural network, or sub-network, of multiple neurons, and the neural network may be developed based on supervised learning using the training data (e.g., labeled data). Unsupervised learning may also be employed. In some instances, the training data may be labeled to reflect the outcome of a session, such as whether the session resulted in a resolution of the problem being discussed, whether the session resulted in the individual purchasing a product, and/or whether the session was followed by additional sessions to attempt to resolve the same issue. Implementations may employ feature engineering, learning curves, anomaly filtering, training algorithm(s), recurrent neural network(s), and/or other techniques.

In some implementations, an acoustic model and a language model may be employed to produce different features that constitute survey characteristics. The acoustic model may be built as a convolutional neural network (CNN), and the language model may be built as a recurrent neural network (RNN).

Figure 8:
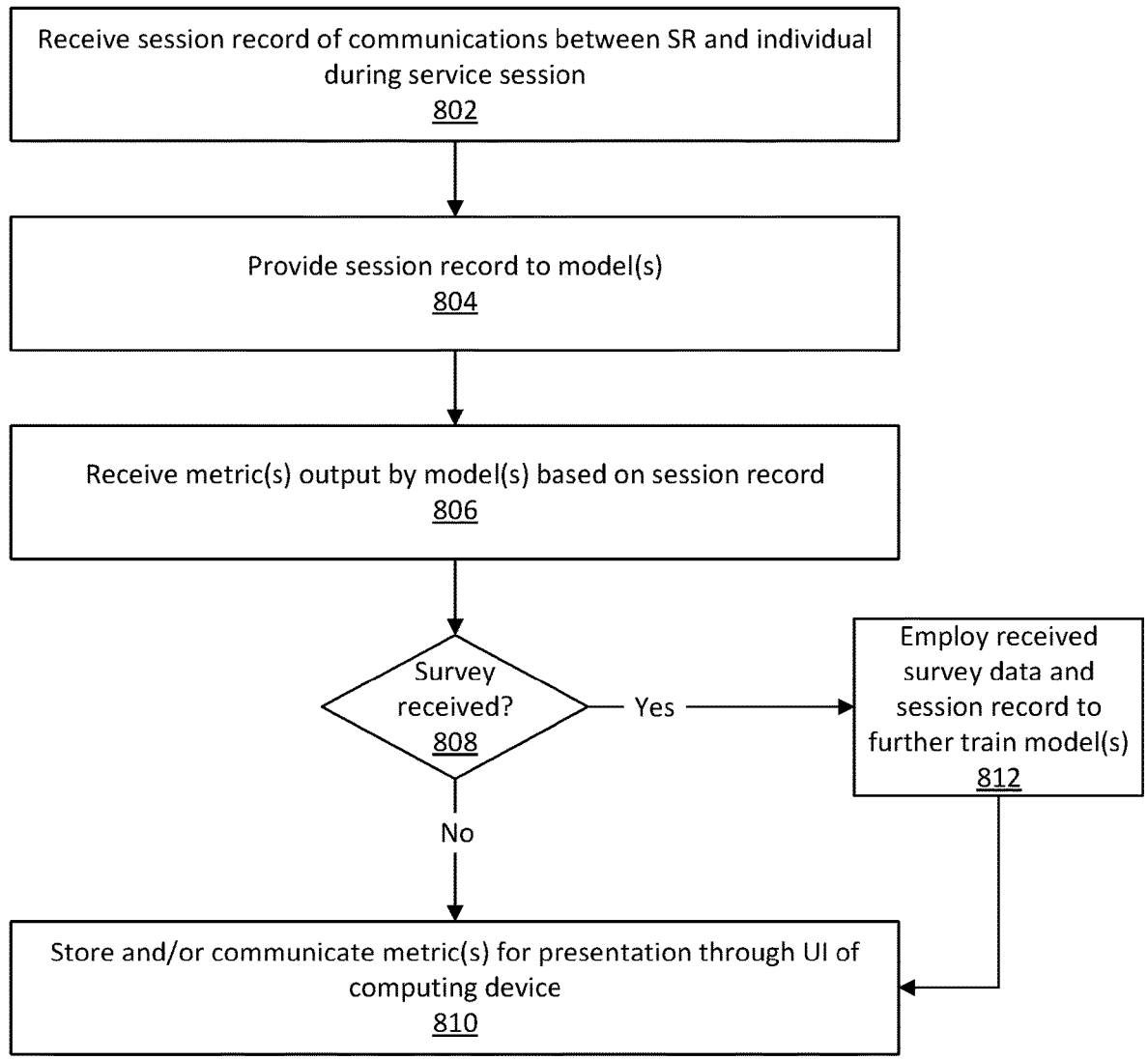
FIG. 8 depicts a flow diagram of an example process for determining metric(s) for service session(s) using the model(s), according to implementations of the present disclosure.
Figure 9:
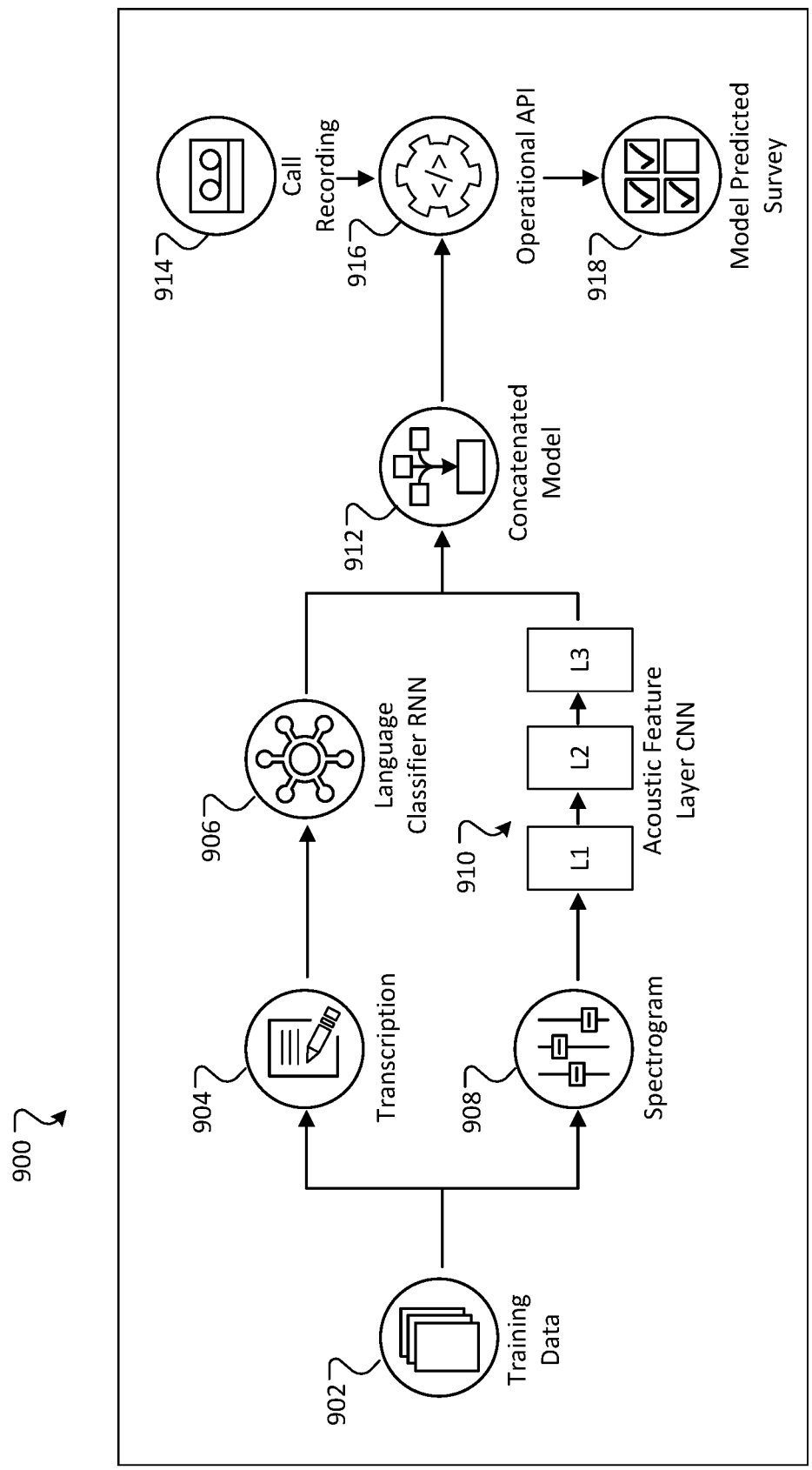
FIG. 9 depicts an example schematic of a system of two neural networks for determining metric(s), according to implementations of the present disclosure.

In some implementations, a concatenated neural network based on the above will be the operational neural network for the survey prediction, as shown in the example of FIG. 8. As shown in the example schematic 900 of FIG. 9, training data 902 may be input to the system. Training data 902 may include call surveys and/or call recordings. Any suitable number of surveys and/or recordings may be employed as training data. For example, approximately 15,000 surveys and 15,000 recordings may be employed. The training data 902 may be provided to a transcription module 904, which transcribes the recordings. The training data 902, at least some of it transcribed, may then be provided to a language classifier RNN 906, which outputs a language model. The training data 902 may also be provided to a spectrogram 908, which analyzes the acoustic properties of the recordings in the training data 902. The output of the spectrogram 908 may be provided to an acoustic feature layer CNN 910, which outputs an acoustic model. The CNN 910 may include any suitable number of layers, each layer modeling a particular acoustic feature or set of acoustic features. The output language model of the RNN 906 and acoustic model of the CNN 910 may be combined into a concatenated model 912. The concatenated model 912 may be employed, through an operational API 916, to analyze call recordings 914 and generate model predicted survey results 918 based on an application of the concatenated model 912 to the call recordings 914.

In some instances, the individual's sentiment (as reflected in the audio data) may exhibit a pattern that changes over the course of a session. For example, an individual may begin a session angry or frustrated, and become calmer and/or more friendly as the session progresses, until an end of the session when the individual and CSR are chatting amiably. Accordingly, a model to predict one or more features may take into account this gradient, and may give greater weight or importance to the sentiment exhibited at the end of the session than the sentiment at the beginning of the session. Such a trend may correlate to overall satisfaction features corresponding to the "overall satisfaction" questions that would be answered in a survey. In general, features that are predicted using the model(s) may correspond to survey questions that would be answered by an individual, and the particular metrics that are generated based on the strength of the features may therefore correspond to the survey questions that would be answered by the individual, had the individual completed a survey.

Other types of features may also be predicted or estimated based on the model(s) 918, in addition to, or instead of, predicting survey results for sessions. For example, the model(s) 918 may predict a feature that is the probability of fraud. Such a feature may be modeled using a classifier that is trained using unlabeled data, through an unsupervised training technique. For example, acoustic models of behavior indicate that the possibility that an individual is engaged in fraud is higher if the individual's vocal register increases in pitch as the individual is challenged with questions, whereas an individual engaged in legitimate activate may have their vocal register decrease in pitch as they are challenged. Based on such behavioral patterns, model may be developed to predict the likelihood of fraudulent activity occurring during a session.

Other modeled features may include friction in user experience for the individual, indicating the individual's overall experience using the support environment. For example, friction may indicate how easy, or how difficult, it is for an individual to navigate a call tree in a call center, how easy or difficult it is for an individual to initially connect to the support environment, and so forth. If a model predicts a high likelihood of friction for a particular cluster of individuals, and if an individual who fits into that cluster contacts the service environment, particular efforts may be made to provide a lower friction experience for that individual. Modeled features may also include a close opportunity feature, which indicates how likely the individual is to purchase a product or service that was discussed during the session. If a model predicts a low likelihood of selling a product to a particular cluster of individuals, and if an individual who fits into that cluster contacts the service environment, particular efforts may be made to provide greater incentives for the individual to purchase a product. In some implementations, different features may have different models (e.g., classifiers and/or neural networks) developed to predict the corresponding feature.

In some implementations, a large sample of historical session data (e.g., session records and associated survey results) may be employed to develop the model(s) 918. Such large sample may provide for the development of model(s) 918 that take into account a wide variance, among the historical session, in the call length, the time of day of the call, the time of year of the call, the different characteristics of individuals, the different products and/or issues being discussed, and/or other session characteristics. A goal of the modeling may be to provide estimates or predictions of features, corresponding to survey scores, with at least a threshold degree of accuracy (e.g., at least 90% accurate).

Implementations may also employ unlabeled data to develop the model(s) 918. In some implementations, clustering techniques may be applied to develop model(s) 918 based on unlabeled data. Clustering may determine sets (e.g., clusters) of individuals that are similar in some way with respect to their characteristics, such as the problems they are concerned with, the products they own, the services they use, their wait times in a service queue waiting for a CSR, and so forth. Clustering may be described as self-classification without the use of labeled data. In some implementations, clustering may be employed to determine routing decisions within the service environment. For example, some clusters of individuals may be routed to a human CSR, whereas other clusters of individuals may be routed to a virtual CSR (e.g., an artificial intelligence) for at least initial servicing within the service environment. As another example, certain clusters may be routed to a particular set of human CSRs whereas other clusters may be routed to a different set of (e.g., more suitable) human CSRs. In some implementations, features may be modeled for other aspects of user interaction of individuals with a service environment. For example, features may model whether particular clusters of individuals prefer a particular workflow within a user interface such as a web site or a mobile application, and/or other individuals prefer a particular landing page (e.g., starting point) to begin navigating a workflow. Certain features may be modeled using a combination of clustering and classification.

In some implementations, ML may be employed for operational scheduling in a service environment. For example, deep learning techniques may be employed that account for inputs and/or outputs produced by multiple intermediary systems. Different processes within a call center or other service environment may each expend considerable effort spent operational scheduling, such as determining which CSRs are to be staffed at what times to be available to service individuals. Traditionally, such scheduling as focused on the forecasting of expected traffic (e.g., number of calls) into the service environment, based on past history and/or trends exhibited for certain queues or related to certain support issues. Such traffic estimates may then be used to determine the staff needed at various times. Such traditional techniques are less useful in current service environments, given that individuals may contact the service environment (e.g., call into a call center) at different stages of their problem resolution process. For example, an individual may begin trying to resolve a problem through a web site or help features of a mobile app, and the individual may later contact a call center or request a live chat session with a CSR with the individual runs into a problem or question they cannot resolve themselves. Individuals may ask for help with a portion of a process to resolve an issue, instead of the whole process. Accordingly, applying traditional methods to determine staff scheduling in a current service environment may lead to overstaffing or understaffing.

In some implementations, the model(s) 918 may be developed to predict staffing needs within the service environment, such as the number of type (e.g., issue expertise) of CSRs that are to be available for servicing individuals during various time periods. Such modeling may identify patterns, such as a pattern in the change in demand for support in a call center following changes to an app or web page. Implementations provide a forecast of the activities that individuals are performing through the various (e.g., online) transactional services provided by an organization, and such a forecast is used to determine the staffing of a service environment at any given time. Model(s) may be developed that calibrate one or more organizational (e.g., business) functions that have an impact on why and/or when individuals may contact the call center or other service environment. For example, the models may predict a number or frequency of individual support requests that may occur in response to a change of expiration date on a credit card, a change of interest rate on accounts, and so forth. The models may also predict the number or frequency of support requests that may occur in response to external events, such as weather events, financial market events, world or local news events, and so forth. The number of expected transactions (e.g., calls into a call center) may be modeled through ML techniques. The particular characteristics of such transactions may also be modeled, such as the number of support requests that are submitted digitally (e.g., through web site or app) versus non-digitally (e.g., through a telephonic call center), the number of support requests to human CSRs versus virtual CSRs, and so forth. To model based on new organizational (e.g., business) functions for which there is no historical data available, clustering may be employed to model based on a reason that transactions occur instead of a history of the occurrence of such transactions. Modeling may employ any one of, or a combination of, regression, classification, clustering, and/or other ML techniques.

Figure 7:
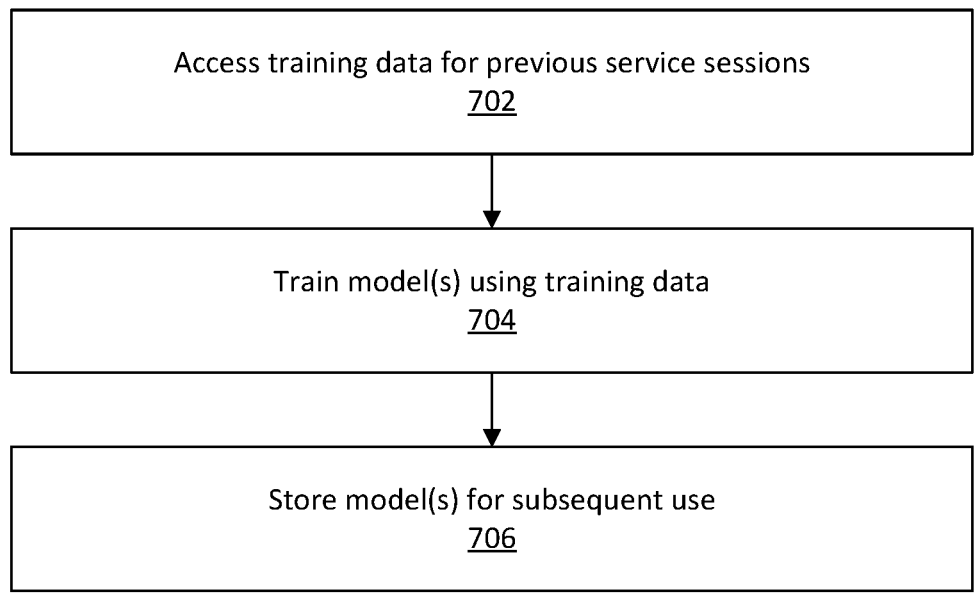
FIG. 7 depicts a flow diagram of an example process for providing model(s) for determining metric(s), according to implementations of the present disclosure.

FIG. 7 depicts a flow diagram of an example process for providing model(s) 518 for determining metric(s) 520, according to implementations of the present disclosure. Operations of the process may be performed by the analysis module(s) 516, the ML module(s) 522, the CSR application 510, and/or other software module(s) executing on the analysis device(s) 514, the CSR device 508, and/or elsewhere.

Training data 524 may be accessed (702). As described above, in some instances the training data 524 is labeled data associated with previous service sessions, such as session records and associated survey results. The model(s) 518 may be trained (704) or otherwise developed based on the training data 524, as described above. The model(s) 518 may then be stored (706) for subsequent use in predicting metric(s) 520 corresponding to survey score(s) 606.

FIG. 8 depicts a flow diagram of an example process for determining metric(s) 520 for service session(s) 506 using the model(s) 518, according to implementations of the present disclosure. Operations of the process may be performed by the analysis module(s) 516, the ML module(s) 522, the CSR application 510, and/or other software module(s) executing on the analysis device(s) 514, the CSR device 508, and/or elsewhere.

The session record 512 of a service session 506 may be received (802). As described above, the service record 512 of a service session 506 may describe communication(s) between a CSR 502 and an individual 504 during the service session 506. A service record 512 may describe a complete session 506 or a portion of a session 506. The session record 512 may be provided (804) as input to the model(s) 518 that were previously developed and stored. The metric(s) 520 output by the model(s) 518 based on the session record 512 may be received (806). In some implementations, a determination may be made (808) whether a survey has also been received from an individual 504 for this particular service session 512. If not, the metric(s) 520 may be stored and/or communicated (810) for presentation through a UI of a computing device, such as the CSR device 508 or other computing device. In instances where a survey has been received, the received survey data and associated session record may be employed (812) as training data to further train (e.g., refine) the model(s) 518, by comparing the predicted metric(s) 520 to the actual received survey score(s) 606. The metric(s) 520 may be stored and/or communicated for presentation (810). Model(s) 518 (e.g., once sufficiently trained and developed to provide accurate estimates) may also be employed to retroactively generate metric(s) 520 for historical session record(s) 512 for which a survey was not initially completed by the serviced individual.

Referring back to FIG. 4, in some implementations, in addition to tracking the reputation of the customer service representative 204 the system may track the experience of the customer 204. For example, the system may track the quality of the last five interaction of the customer with the business, as determined by the determined metrics associated with those interactions. Other numbers of interactions may also be checked, for example, the last 3, 10 or 20 interactions. In some implementations, the number of interactions may be tracked over a period of time, for example, all of the interactions that the customer had with the business over the past week, month, quarter, year, or for all time. The experiences may be stored in a customer experience profile.

The customer's experience may be determined across a variety of different criteria. For example, the customer's experience may be rated based on whether or not the customer received a satisfactory outcome based on their intent. For example, if a customer wishes to transfer money, a satisfactory outcome may be the funds are transferred. If a customer wishes to make an insurance claim, then a satisfactory outcome may be the initiation of the insurance claim.

The customer's experience may be rated based on empathy and courtesy. The empathy and courtesy rating may be based on an objective measurement of how well the customer is treated by the customer service representative. The empathy and courtesy rating may also be determined how the customer responded to the customer service representative.

The customer's experience and the member experience profile may be used to alter the customer requirements 422. For example, if a user has a series of negative experiences, or experiences that are below the level of experience desired by the business (which may be determined based on a several different metrics, as described further below) then the customer requirements 422 may be updated accordingly. For example, if the user has been reacting poorly to the level of courtesy, then the courtesy requirement in the customer requirements may be increased. If the customer has not had their intent (the reason the customer called) satisfied, then the customer requirement for competency may be increased.

In some implementations, the system may alter customer requirements based on the requirements of other customers who have similar intent. For example, customers calling to submit an insurance claim may require a higher level of empathy than the same customer when checking an account balance or paying a bill.

In some implementations, as described above, a neural net may be trained using training data based on human graded experiences (what are the causes of complaints, what are the causes of low survey results, what are positive results). Neural nets job is to produce these features.

Figure 10:
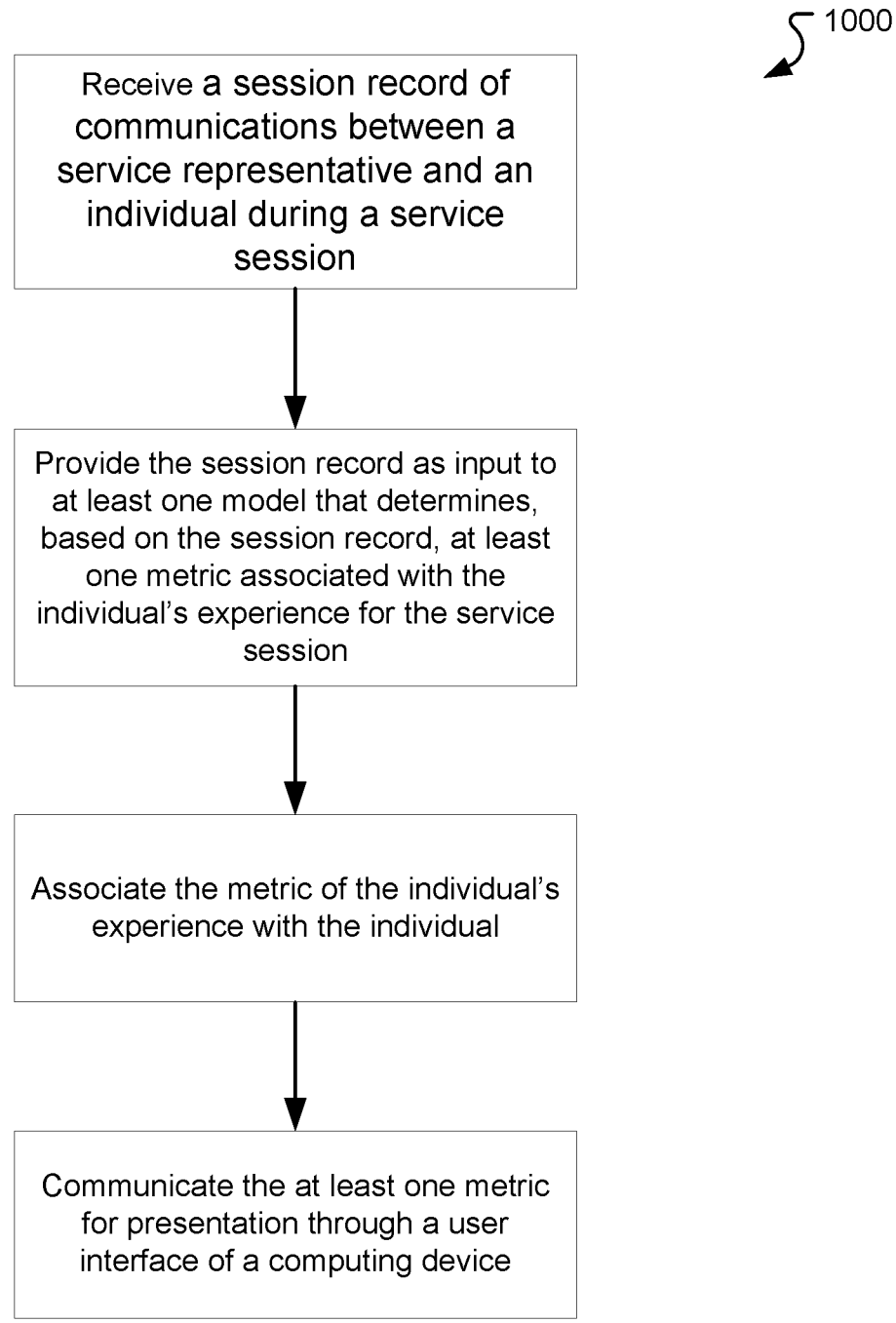
FIG. 10 is a flowchart of an example process for determining customer experience metrics.

FIG. 10 is a flowchart of an example of a process 1000 for determining customer experience metrics.

The process 1000 receives 1002 a session record of communications between a service representative and an individual during a service session. The individual may be, for example, a customer.

The process 1000 provides 1004 the session record as input to at least one computer-processable model that determines, based on the session record, at least one metric for the service session, the at least one model having been trained, using machine learning and based at least partly on survey data for previous service sessions, to provide the at least one metric associated with the individual's experience. The service session may be an audio call (for example, a telephone call or voice chat) between the customer service representative and the individual.

The process 1000 associates 1006, by at least one process 1000 or, the metric of the individual's experience with the individual; and The process 1000 communicates 1008 the at least one metric for presentation through a user interface of a computing device.

The metrics may be used to alter future system behavior. For example, the metrics may effect which customer service representative the customer is routed during a subsequent call or other interaction.

Figure 11:
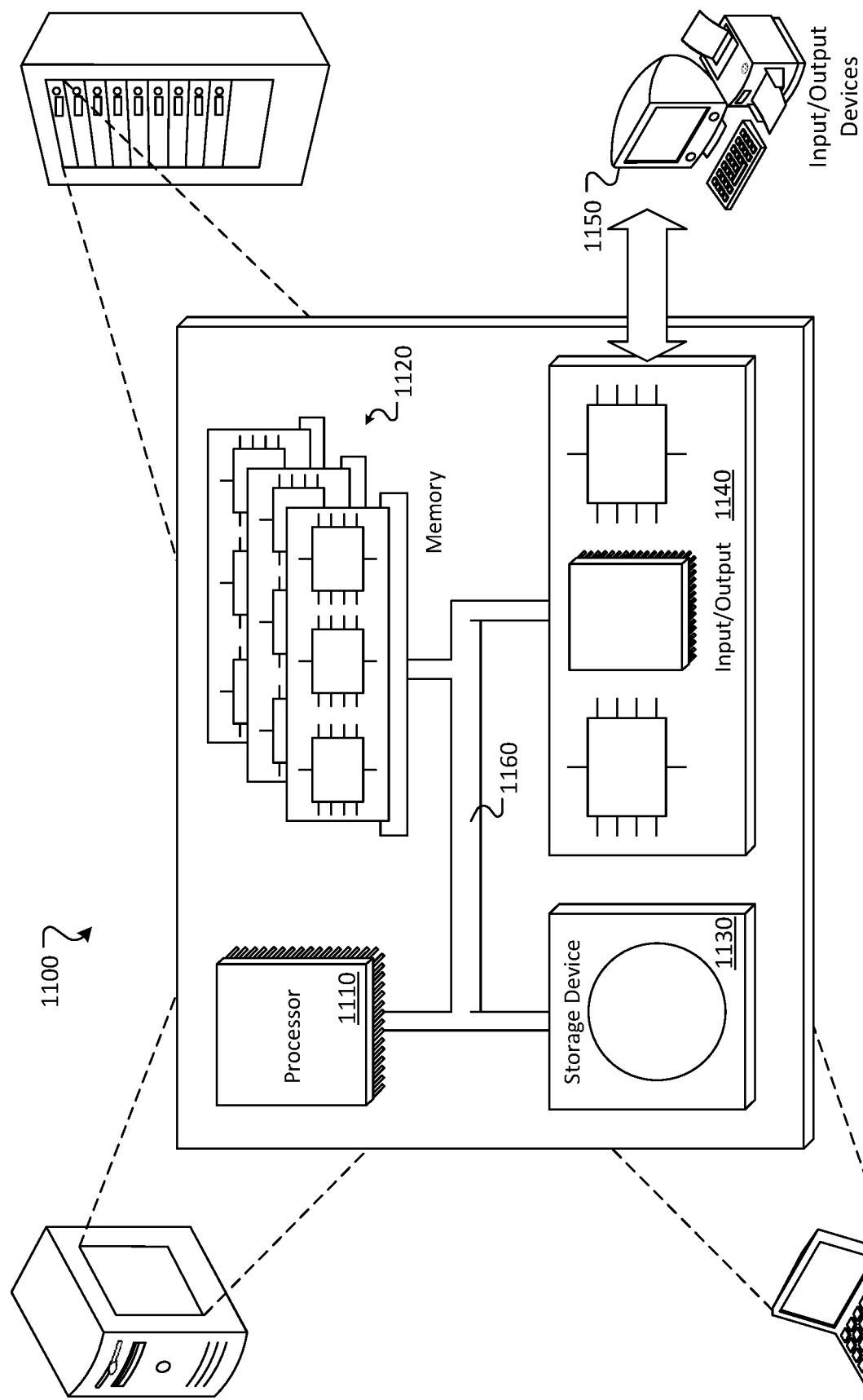
FIG. 11 depicts an example computing system, according to implementations of the present disclosure.

FIG. 11 depicts an example computing system, according to implementations of the present disclosure. The system 1100 may be used for any of the operations described herein with respect to the various implementations discussed herein. For example, the system 1100 may be included, at least in part, in one or more of the CSR device 508, the analysis device(s) 514, and/or the user device 526, and/or other computing device(s) or system(s) described herein. The system 1100 may include one or more processors 1110, a memory 1120, one or more storage devices 1130, and one or more input/output (I/O) devices 1150 controllable through one or more I/O interfaces 1140. The various components 1110, 1120, 1130, 1140, or 1150 may be interconnected through at least one system bus 1160, which may enable the transfer of data between the various modules and components of the system 1100.

The processor(s) 1110 may be configured to process instructions for execution within the system 1100. The processor(s) 1110 may include single-threaded processor(s), multi-threaded processor(s), or both. The processor(s) 1110 may be configured to process instructions stored in the memory 1120 or on the storage device(s) 1130. The processor(s) 1110 may include hardware-based processor(s) each including one or more cores. The processor(s) 1110 may include general purpose processor(s), special purpose processor(s), or both.

The memory 1120 may store information within the system 1100. In some implementations, the memory 1120 includes one or more computer-readable media. The memory 1120 may include any number of volatile memory units, any number of non-volatile memory units, or both volatile and non-volatile memory units. The memory 1120 may include read-only memory, random access memory, or both. In some examples, the memory 1120 may be employed as active or physical memory by one or more executing software modules.

The storage device(s) 1130 may be configured to provide (e.g., persistent) mass storage for the system 1100. In some implementations, the storage device(s) 1130 may include one or more computer-readable media. For example, the storage device(s) 1130 may include a floppy disk device, a hard disk device, an optical disk device, or a tape device. The storage device(s) 1130 may include read-only memory, random access memory, or both. The storage device(s) 1130 may include one or more of an internal hard drive, an external hard drive, or a removable drive.

One or both of the memory 1120 or the storage device(s) 1130 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1100. In some implementations, the CRSM may include a data store that provides storage of computer-readable instructions or other information in a non-transitory format. The CRSM may be incorporated into the system 1100 or may be external with respect to the system 1100. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1110 and the memory 1120 may be supplemented by, or incorporated into, one or more application-specific integrated circuits (ASICs).

The system 1100 may include one or more I/O devices 1150. The I/O device(s) 1150 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1150 may also include one or more output devices such as a display, LED(s), an audio output device (e.g., a speaker), a printer, a haptic output device, and so forth. The I/O device(s) 1150 may be physically incorporated in one or more computing devices of the system 1100, or may be external with respect to one or more computing devices of the system 1100.

The system 1100 may include one or more I/O interfaces 1140 to enable components or modules of the system 1100 to control, interface with, or otherwise communicate with the I/O device(s) 1150. The I/O interface(s) 1140 may enable information to be transferred in or out of the system 1100, or between components of the system 1100, through serial communication, parallel communication, or other types of communication. For example, the I/O interface(s) 1140 may comply with a version of the RS-232 standard for serial ports, or with a version of the IEEE 1284 standard for parallel ports. As another example, the I/O interface(s) 1140 may be configured to provide a connection over Universal Serial Bus (USB) or Ethernet. In some examples, the I/O interface(s) 1140 may be configured to provide a serial connection that is compliant with a version of the IEEE 1394 standard.

The I/O interface(s) 1140 may also include one or more network interfaces that enable communications between computing devices in the system 1100, or between the system 1100 and other network-connected computing systems. The network interface(s) may include one or more network interface controllers (NICs) or other types of transceiver devices configured to send and receive communications over one or more networks using any network protocol.

Computing devices of the system 1100 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1100 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   training a neural network to process a first record of communications between a first service representative (SR) and a first individual during a first service session to generate one or more predicted survey scores that rate the first service session on one or more criteria, wherein the training is conducted using training data comprising, for each of one or more previous service sessions, a respective previous record of the previous service session and a respective set of one or more actual survey scores provided by a serviced individual to rate the previous service session on the one or more criteria;
   receiving, by at least one processor, a second record of communications between a second service representative (SR) and a second individual during a second service session;
   processing, using the trained neural network, the second record to determine one or more new predicted survey scores that rate the second service session;
   associating, by at least one processor, the one or more new predicted survey scores with the second individual; and
   communicating, by at least one processor, the one or more new predicted survey scores for presentation through a user interface of a computing device.

2. The computer-implemented method of claim 1, wherein:
   the second service session is an audio call between the SR and the individual; and
   the second record includes an audio record of at least a portion of the audio call.

3. The computer-implemented method of claim 1, wherein:
   the respective previous service session is an audio call; and
   the respective previous record includes an audio record of at least a portion of the audio call.

4. The computer-implemented method of claim 1, further comprising:
   updating requirements of the second individual's based on a metric; and
   selecting another service representative to interact with the second individual on a subsequent service session based in part on the updated requirements.

5. The computer-implemented method of claim 1, further comprising:
   receiving a request for a service session from a third individual;
   identifying a fourth individual similar to the third individual; and
   connecting the third individual with another service representative, where the other service representative is selected, at least in part, based on metrics associated with the fourth individual.

6. A system comprising:
   at least one processor; and a data store coupled to the at least one processor having instructions stored thereon which, when executed by the at least one processor, causes the at least one processor to perform operations comprising:
   training a neural network to process a first record of communications between a first service representative (SR) and a first individual during a first service session to generate one or more predicted survey scores that rate the first service session on one or more criteria, wherein the training is conducted using training data comprising, for each of one or more previous service sessions, a respective previous record of the previous service session and a respective set of one or more actual survey scores provided by a serviced individual to rate the previous service session on the one or more criteria;
   receiving a second record of communications between a second service representative (SR) and a second individual during a second service session;
   processing, using the trained neural network, the second record to determine one or more new predicted survey scores that rate the second service session;
   associating the one or more new predicted survey scores with the second individual; and
   communicating the one or more new predicted survey scores for presentation through a user interface of a computing device.

7. The system of claim 6, wherein:
   the second service session is an audio call between the SR and the individual; and
   the second record includes an audio record of at least a portion of the audio call.

8. The system of claim 6, wherein:
   the respective previous service session is an audio call; and
   the respective previous record includes an audio record of at least a portion of the audio call.

9. The system of claim 6, further comprising:
   updating requirements of the second individual's based on a metric; and
   selecting another service representative to interact with the second individual on a subsequent service session based in part on the updated requirements.

10. The system of claim 6, further comprising:
    receiving a request for a service session from a third individual;
    identifying a fourth individual similar to the third individual; and connecting the third individual with another service representative, where the other service representative is selected, at least in part, based on metrics associated with the fourth individual.

11. A non-transitory computer readable storage medium storing instructions that, when executed by at least one processor, cause the at least one processor to perform operations comprising:

training a neural network to process a first record of communications between a first service representative (SR) and a first individual during a first service session to generate one or more predicted survey scores that rate the first service session on one or more criteria, wherein the training is conducted using training data comprising, for each of one or more previous service sessions, a respective previous record of the previous service session and a respective set of one or more actual survey scores provided by a serviced individual to rate the previous service session on the one or more criteria;

receiving a second record of communications between a second service representative (SR) and a second individual during a second service session;

processing, using the trained neural network, the second record to determine one or more new predicted survey scores that rate the second service session;

associating the one or more new predicted survey scores with the second individual; and communicating the one or more new predicted survey scores for presentation through a user interface of a computing device.

12. The medium of claim 11, wherein:
the second service session is an audio call between the SR and the individual; and
the second record includes an audio record of at least a portion of the audio call.

13. The medium of claim 11, wherein:
the respective previous service session is an audio call; and
the respective previous record includes an audio record of at least a portion of the audio call.

14. The medium of claim 11, further comprising:
updating requirements of the second individual's based on a metric; and
selecting another service representative to interact with the second individual on a subsequent service session based in part on the updated requirements.

15. The medium of claim 11, further comprising:
receiving a request for a service session from a third individual;
identifying a fourth individual similar to the third individual; and
connecting the third individual with another service representative, where the other service representative is selected, at least in part, based on metrics associated with the fourth individual.

* * * * *